United States Patent
Rützel

[19]

[11] Patent Number: 5,954,349
[45] Date of Patent: Sep. 21, 1999

[54] SCOOTER WITH FRONT AND REAR WHEEL STEERING

[76] Inventor: Ralf Rützel, Hinterbärenbadstrasse 2, 81373 München, Germany

[21] Appl. No.: 08/874,756

[22] Filed: Jun. 13, 1997

[30] Foreign Application Priority Data

Jun. 14, 1996 [DE] Germany .............................. 196 23 877
Jan. 27, 1997 [DE] Germany .............................. 197 02 772

[51] Int. Cl.⁶ ............................................... B62K 21/00
[52] U.S. Cl. ...................... 280/87.041; 280/267; 280/100
[58] Field of Search ........................... 280/11.23, 87.041, 280/87.021, 267, 100, 102

[56] References Cited

U.S. PATENT DOCUMENTS

| 94,056 | 8/1869 | Allen ......................................... 280/100 |
| 230,428 | 7/1880 | McGann ................................... 280/102 |
| 595,490 | 12/1897 | Montgomery ............................ 280/100 |
| 2,651,526 | 9/1953 | Eubanks ................................... 280/100 |
| 3,043,601 | 7/1962 | Kober ....................................... 280/102 |
| 3,533,644 | 10/1970 | Humes ...................................... 280/100 |
| 3,620,547 | 11/1971 | Vaverek . | |
| 4,555,122 | 11/1985 | Harvey . | |
| 4,618,160 | 10/1986 | McElfresh . | |
| 4,799,702 | 1/1989 | Wang . | |

FOREIGN PATENT DOCUMENTS

| 902 765 | 9/1945 | France . |
| 49 794 | 8/1966 | Germany . |
| 32 00 160 | 7/1983 | Germany . |
| 33 35 285 | 2/1984 | Germany . |
| 37 27 771 | 3/1989 | Germany . |

*Primary Examiner*—J J Swann
*Assistant Examiner*—Michael Mar
*Attorney, Agent, or Firm*—Cohen, Pontani, Lieberman & Pavane

[57] ABSTRACT

A two-wheeled scooter with a frame and a standing board attached thereto. Two steering tubes, each with a pivotable fork for the front or rear wheel, are provided on the frame. The steering tubes are inclined toward one another and relative to vertical at an acute angle. The turning angle of the front wheel causes a turning angle of the rear wheel via a connection arrangement. The steering connection between the front wheel and the rear wheel is carried out by driving disks, which are attached in rotation-proof fashion to the forks and connected to each other, for example, via a flexible steel cable, so that the front and rear wheel forks turn in opposite directions with the same turning angle. Because of the dependence of the steering movements of the front and rear wheels and their control by a standard bicycle steering rod with a handle bar, travel is controlled precisely and thus operational safety is optimized.

17 Claims, 5 Drawing Sheets

SCOOTER WITH FRONT AND REAR WHEEL STEERING

BACKGROUND OF THE INVENTION

1. Field of the Invention

The invention relates to a scooter, i.e., a two-wheeled, one-track, muscle-powered rolling vehicle, which can be used, in particular, for recreational use, as well as for transportation in urban areas.

2. Description of the Prior Art

Scooters, in particular as they are known as a sports and recreational device for children and adults, are usually driven by pushing with one leg against the ground. Steering is undertaken by hand via a bicycle-like steering rod with a handle bar that acts exclusively on the front wheel. Because of this design, a turning circle is needed to turn the vehicle that corresponds, in normal use, to at least double the wheelbase of the vehicle. Furthermore, the rear wheel of a scooter of this type does not follow the track of the front wheel exactly, making it more difficult to deliberately avoid obstacles with an estimate of both tracks of the wheels.

The maneuverability of such a scooter could be improved by a steerable rear wheel. Scooters of this type with two steered axles are known, for example, from U.S. Pat. No. 4,799,702. Here, the displacement of the rear axle is initiated by a weight shift and the slanted position of the standing board that results. The rear wheel fork is embodied in such a way as to be pivotable around an axle vertically relative to the longitudinal direction of the vehicle. The pivoting movement is limited by a crossbar, to the ends of which are attached two helical springs. This arrangement causes a displacement of the beam against spring force and a pivot back into the rest position for straight-ahead travel. Here, the relatively inexact control of the rear directional control, which is only carried out via the feet on the standing board, is disadvantageous. The independent displacement of the two axles can result in out-of-track travel by the rear part of the scooter relative to the front part, which negatively influences straight-ahead travel. Maneuverability is only slightly increased with this type of two-axle steering.

Furthermore, a scooter is known from U.S. Pat. No. 4,555,122, whose rear wheel turning angle is dependent on the turning angle of the front wheel. This forced steering avoids some of the disadvantages of independent rear wheel guidance. However, in this design, which has a rod coupling of the two forks, the relatively imprecise directional control of the rear wheel is disadvantageous. Depending on the turning angle, the rear wheel runs more or less out of the track of the front wheel. In the case of a small turning angle, the turn of the rear wheel follows that of the front wheel rather exactly. In the case of a stronger turn of the front wheel, however, the turn of the rear wheel again becomes increasingly smaller. In addition, the two forks of this scooter are exactly vertical, i.e., the steering axles are parallel to the vertical axle of the scooter. This causes relatively unfavorable driving performance with respect to straight-ahead travel and maneuverability, because there is no after-running of the wheels. Furthermore, it is only conditionally possible to generate forward drive by means of a swinging body motion and thus a serpentine motion of travel.

Finally, U.S. Pat. No. 3,620,547 discloses a scooter with steerable front and rear wheels. The front wheel is turned in a conventional fashion via a handle bar, while the rear wheel is independently turnable. As a result, both parallel turning angles ("crab steering") and turning angles in opposite directions are possible. Without explaining further, the aforementioned patent speaks of positive steering of the rear wheel, dependent on the angle of turn of the front wheel. Whether this steering is carried out with the help of a belt, a chain or perhaps a rod linkage is not specified.

Moreover, a bicycle with conventional pedal drive is known from German reference DE 37 27 771 A1. The driven front wheel is connected rigidly, i.e., in non-steered fashion, to the frame. Steering is provided by a smaller rear wheel. The transmission of the steering movement from the steering rod to the rear wheel is carried out essentially by an endless drive, such as a chain, knob or toothed belt or steel cable. The transmission of power from the rotatable axles, namely, the steering rod and the rear wheel fork, to the endless drive is carried out by driving and output gears, which are connected in rotation-proof fashion to the axles and around which the endless drive is placed. This type of power transmission, however, cannot simply be transferred to scooters.

Furthermore, in all of the aforementioned scooters, which constitute the prior art, it is necessary, in order to maintain a certain speed on a level surface, to repeatedly push one's leg against the ground.

SUMMARY OF THE INVENTION

Accordingly, it is an object of the present invention to provide a scooter with which maneuverable, controlled and safe forward motion is possible with and without pushing of the operator's leg against the ground. To ensure the most exact directional control possible, the rear wheel travels exactly in the track of the front wheel.

Pursuant to the object, and others which will become apparent hereafter, the scooter according to the invention has a rear wheel fork that can be pivoted in substantially the same manner as the front wheel fork and executes a steering movement in the opposite direction to the front wheel fork. The pivotability of the two forks is ensured by two driving disks connected to the forks in rotation-proof fashion. These driving disks are connected via a flexible transmission-element arrangement. For this reason and because of the use of like driving disks, i.e., disks with the same transmission ratio, in the front and the rear, opposite turns of the front and rear wheel forks with the same turning angle are carried out. This permits the turning circle to be halved, compared to conventional scooters, with respect to the wheelbase. The maneuverability achieved in this way permits turns in a small area, e.g., on a sidewalk, without interruption of travel. Furthermore, because of the special geometry of the forks, the track of the rear wheel follows that of the front wheel on curves, permitting obstacles to be accurately and safely avoided. Because of the dependence of the control movements of the front and rear wheel and their control by means of a standard bicycle steering rod with a handle bar, travel can be precisely controlled and thus operational safety can be optimized.

Furthermore, the track course of the two wheels and the resulting movement of the standing board during rhythmic curve travel make it possible to move forward, without bodily contacting the ground, by means of a swinging movement of the body around the vertical axis and the correspondingly changing angle of turn. This means an increase in performance capacity and riding pleasure.

Because the steering tubes in which the pivotable forks are suspended are installed so as to be inclined at an acute angle of at least 5° relative to the vertical axis of the vehicle, the scooter, while being maneuvered, still runs safely straight ahead. The rear steering tube could also be inclined relative to the vertical axis at an acute angle that differs from that of the front steering tube, which allows the riding and steering properties to be influenced even during the design stage.

A mirror-symmetrical structure of the two forks permits the advantageous use of two identical components, which is advantageous for manufacturing and the storage of spare parts.

In a further embodiment of the scooter, it is possible to influence maneuverability and driving performance in a deliberate manner even during the design stage by varying the steering tube angles α and β. With different steering tube angles in the front and rear, additional parameters can be obtained for deliberately shaping the driving characteristics.

A driving disk is advantageously attached in a rotation-proof manner to each fork, either below or above the steering tubes, as desired. The two driving disks are connected to each other via a flexible transmission-element arrangement, so that the angle of turn of the rear wheel fork follows in the opposite direction to the angle of turn of the front wheel fork. The use of two identical driving disks, i.e., disks with the same outer diameter, in particular, ensures that the turning angles are the same in both the front and rear. If the angles of inclination of the steering tubes relative to vertical are of equal size, it is also ensured that the rear wheel will always exactly follow the track of the front wheel.

It is also an advantage for either a steel cable, a belt, a toothed belt or a cable to be provided as the flexible transmission-element arrangement for transmitting the steering movement from the front fork to the rear fork, which is particularly advantageous for steering accuracy and low vehicle weight. The transmission element can be embodied either in one part, i.e., as an endless element, or in two parts. If a belt or a toothed belt is used, it is advantageously embodied in one part and closed. In the case of a cable or a steel cable, a one-part open design or a two-part design, as desired, is useful. In these cases, suitable connections to the driving disks must be provided, such as pear-shaped or drum-shaped nipples at the open end of the cable(s) or steel cable(s). It is also possible, however, to use an attachment of a different design, e.g., a clamping device, on the outer circumference of the driving disks. Guiding the transmission element in a crossing manner ensures that the scooter has an opposite-sense turning angle and not, for example, a parallel one.

In one embodiment, the driving disks for the control and guidance of the transmission element have two radial slots and a broad circumferential guidance groove that permits an approximately double winding of the transmission element. This allows transmission of turning angles of up to 90° on each side. If the aforementioned steel cable is used as the transmission element in an endless one-part open or two-part embodiment, then barrel-shaped or cylindrical nipples are advantageously attached securely, e.g., by soldering, to the ends of the one-part steel cable or the two individual cables. These nipples can then be suspended in axial bores on the outer circumference of the driving disks and fixed in this way.

On the other hand, if an endless toothed belt is used as the transmission element, the driving disks are advantageously embodied as toothed gears, whose tooth face width and depth correspond to the teeth of the belt. In this case, to prevent the toothed belt from slipping off, the driving disks have a guidance piece at the top and the bottom, respectively, the diameter of which is larger than the base in which the toothed belt runs.

To guide the transmission element without contact with the frame and with the lowest friction possible, several deflection rollers are advantageously provided on the frame. If one or more steel cables are provided as the transmission element, the deflection can be carried out by means of slide rails with an adequately large deflection radius, in which the steel cables slide with relatively low friction with the help of grease lubrication. Friction is further reduced when slide-mounted or roller-mounted rollers are used for the purpose of deflection. An adequately large radius of both the outer circumference of the rollers (which advantageously have a guidance groove to prevent the cable from falling out) and the mounting prevents the rollers from jamming after long use or because of dirt. If a belt or a toothed belt is provided as the transmission element, however, only the aforementioned deflection rollers can be used. Deflecting the transmission element with the lowest friction possible ensures low steering forces as well as an exact following by the rear wheel steering movement of the front turn angle without disruptive breakaway torque.

To achieve better power transmission for driving the vehicle by the swinging movement of the body, it is advantageous for the rear part of the standing board to be curved upward at least slightly. This design makes it easier for a driver standing on the footboard in a slanted fashion, as on a skateboard, to control the swinging movement during travel by shifting weight from one leg to another.

To increase operational safety, the scooter should be equipped with a commercially available drum, disk or rim brake. The use of commercially available parts from the bicycle industry has an advantageous effect on production costs. The use of cylindrical nipples at the ends of the steel cable, known from the bicycle industry, also reduces production costs thanks to short assembly times.

Finally, to accentuate the novelty of the steering principle, it is advantageous to embody the frame in an asymmetrical S-shape from the front to the rear steering tube.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
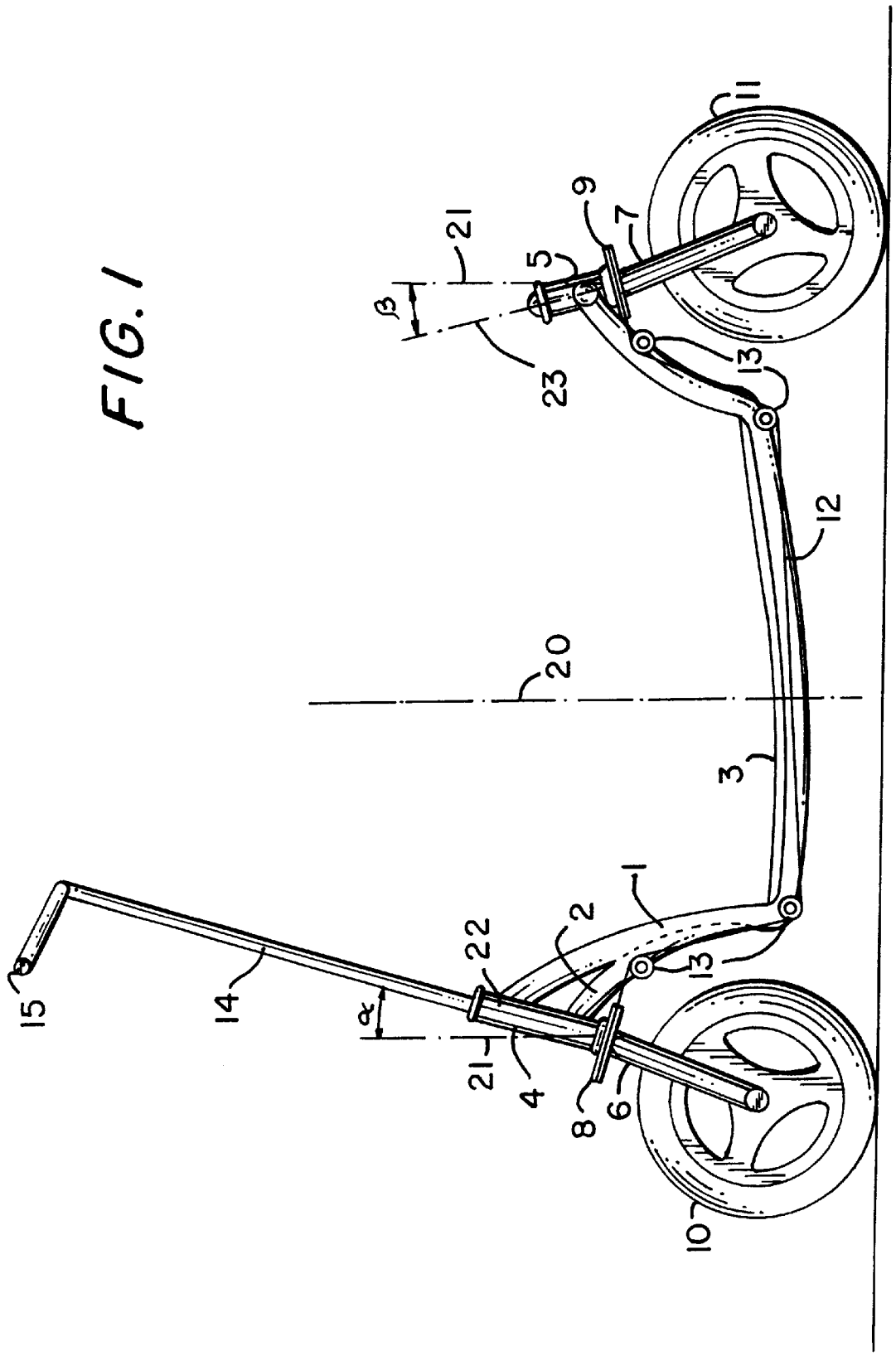
FIG. 1 a side view of the scooter pursuant to the present invention.

FIG. 1 shows a scooter according to the invention, which has a frame 1 made of a curved steel tube with a welded-on reinforcement 2 in the front area. At the front and rear ends, steering tubes 4, 5 are provided for the pivotable mounting of a front wheel fork 6 and a rear wheel fork 7, respectively. A standing board 3 of wood or metal, e.g., aluminum sheet, that is upwardly curved in the rear area is attached to the frame 1. The front wheel fork 6 is connected in a rotation-proof fashion to a front driving disk 8, which transmits a steering movement passed through a handle bar 15 and a steering rod 14 to the front wheel 10 into a pulling and pushing movement to a transmission element 12. This pulling and pushing movement is passed crosswise via deflection rollers 13 to a driving disk 9 attached to the rear steering fork 7. As a result, the rear wheel 11 carries out the steering movement in an opposite direction to the front wheel 10. Turning both the front wheel 10 and the rear wheel 11 results in a very small turning circle and thus very good maneuverability. FIG. 1 also shows that the front steering tube 4 and the rear steering tube 5 each have an acute angle of inclination $\alpha$ and $\beta$, respectively, of at least 5° between the pivot axis of the fork 22, 23 and a line 21 parallel to the vertical axis 20 of the vehicle. As the embodiment in FIG. 1 shows, the angles $\alpha$ and $\beta$ can be of equal size. However, the angles can also be of different sizes. Furthermore, FIG. 1 shows the frame 1 rising toward the rear, as a result of which the rear standing area of the standing board 3 is higher than the front area.

Figure 2:
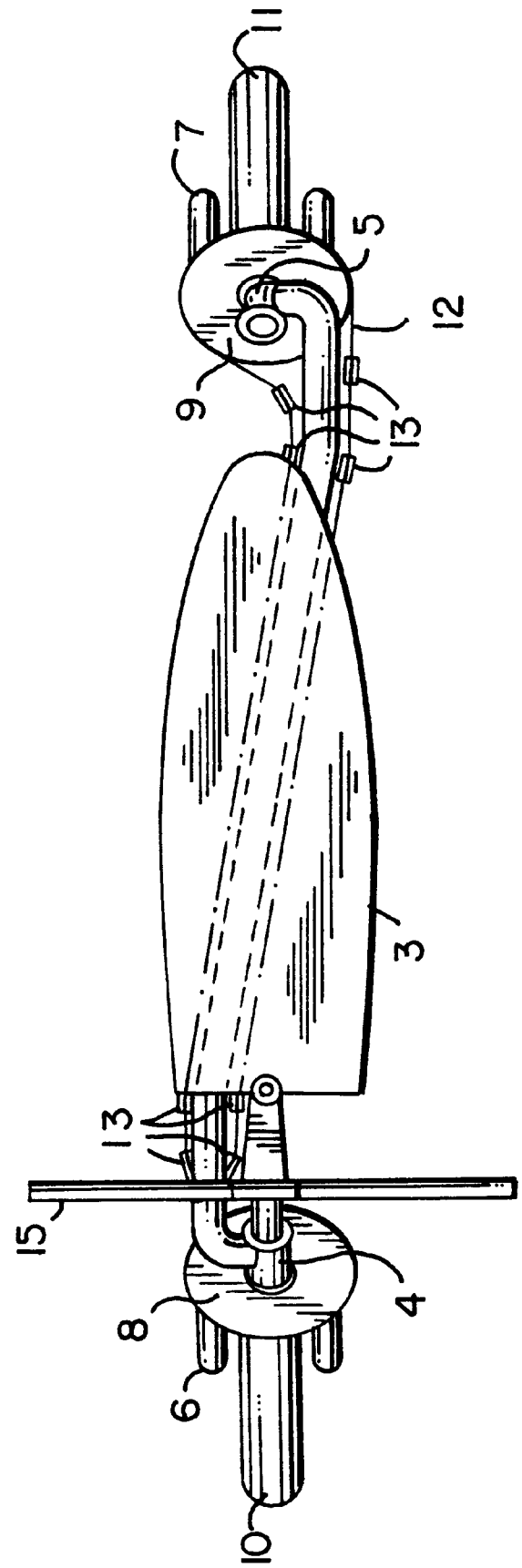
FIG. 2 a top view of the scooter.

FIG. 2, in a top view, basically shows the arrangement of the deflection rollers 13 for the front crosswise guidance of the transmission element 12 and the driving disks 8, 9. The asymmetrical course of the frame 1 with its characteristic S-shape can also be seen clearly in this drawing.

Figure 3:
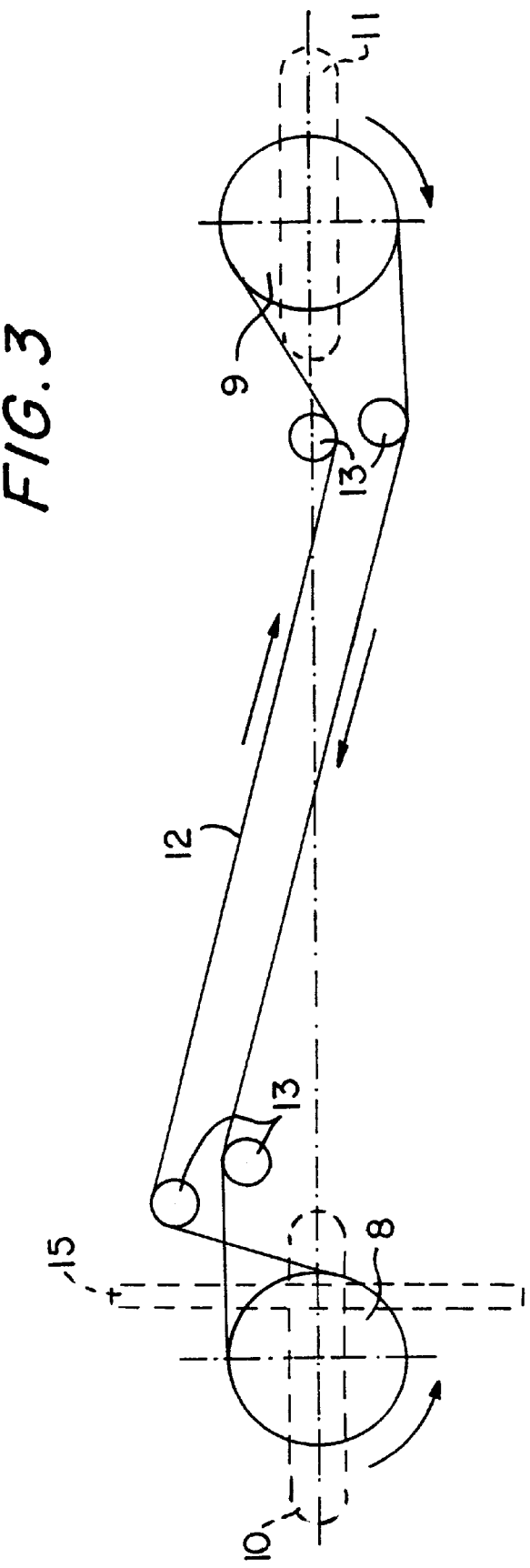
FIG. 3 a schematic top view showing the cable guidance in straight-away travel.

FIG. 3 illustrates the steering principle with the guidance of the transmission element 12. What is essential here is that the transmission element 12 crosses from the right side of the front driving disk 8 in the direction of travel to the left side of the rear driving disk 9 in the direction of travel. This measure leads to a steering movement in the opposite direction of the two wheels 10, 11. If the two driving disks 8 and 9 are equal in size, then equal-sized steering angles result for the front and rear wheel forks.

Figure 4:
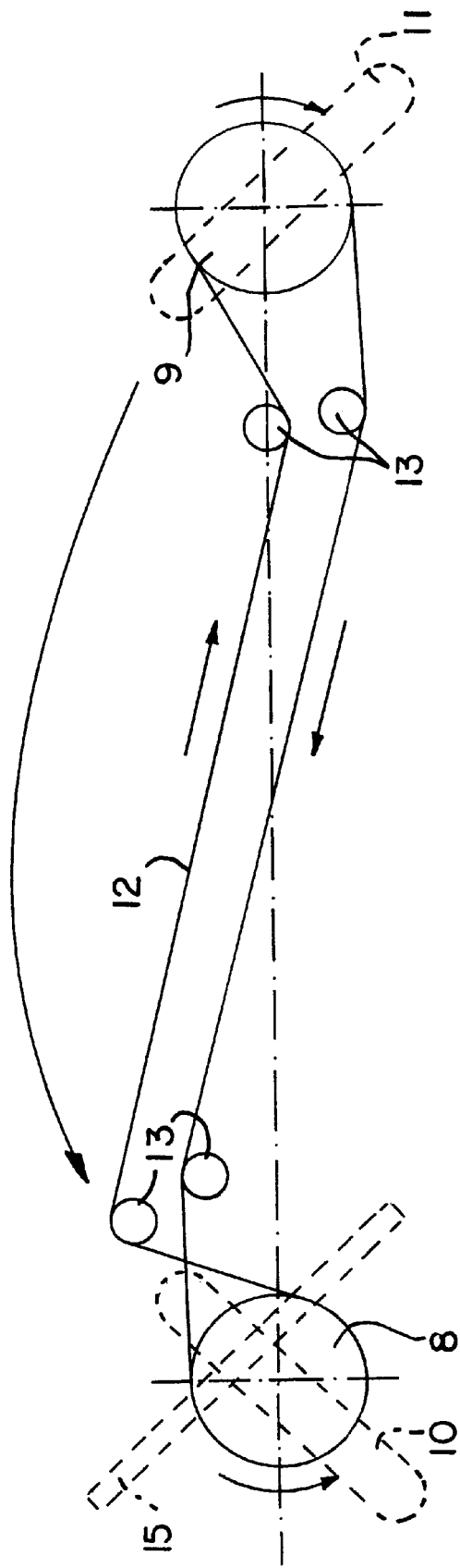
FIG. 4 a schematic top view, similar to FIG. 3, showing the situation on a curve.

FIG. 4 depicts the steering principle in the turned state. It can be seen that the two wheels 10, 11 are deflected in opposite directions.

Figure 5A:
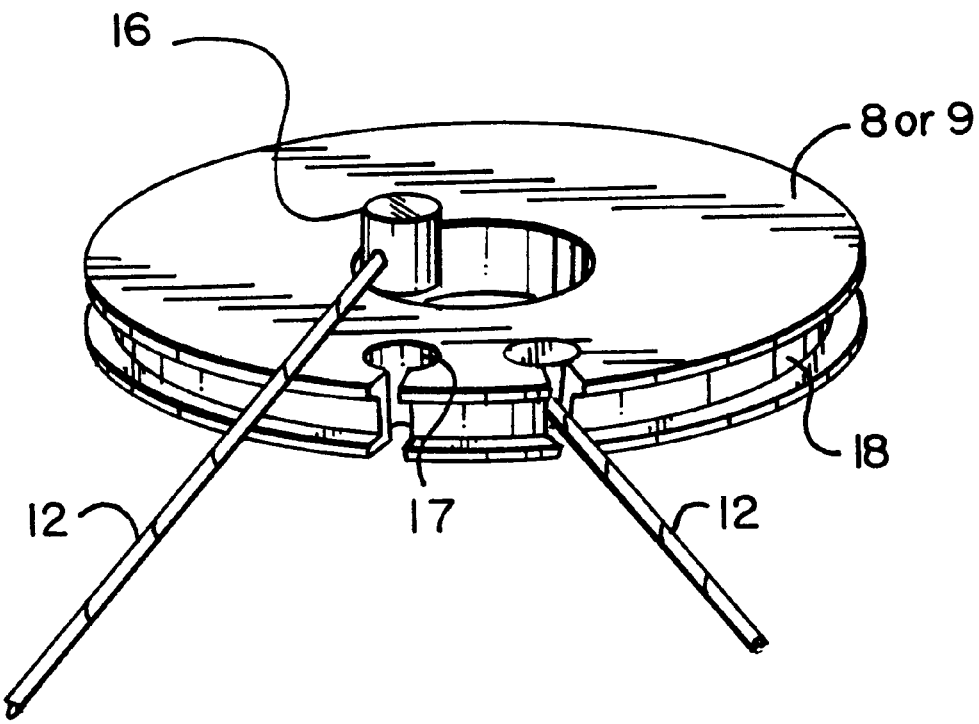
FIG. 5 is a perspective view of a driving disk, showing the attachment of the transmission element or steel cable.
Figure 5B:
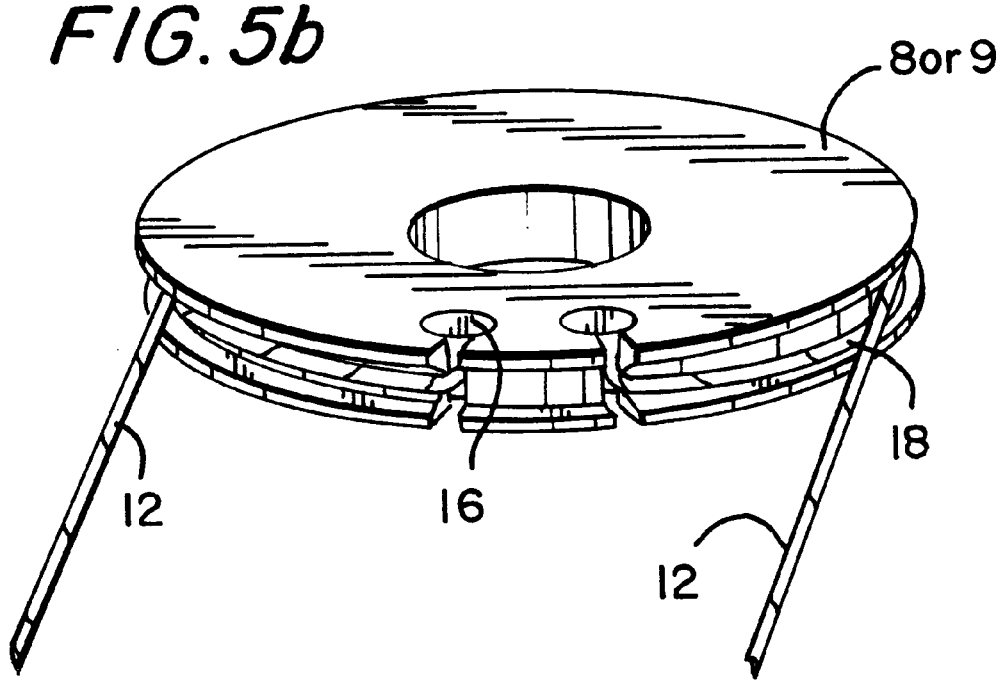

FIGS. 5a and 5b show a detail of a driving disk 8 or 9 in perspective. What is essential here is the attachment of the transmission element 12, shown here, for example, as a divided steel cable. Cylindrical nipples 16 are attached to the ends of the steel cable 12 and are seated in adjacent axial bores 17 in the driving disk. The bores have a radial slot through which the cable 12 extends and executes an approximately double winding in a broad circumferential guidance groove 18 of the disk. In this way it is possible for a turning angle of up to 90° to be transmitted in each direction.

FIG. 5a shows an assembly situation in which a first nipple 16 is placed into the bore 17 and the cable 12 runs out radially through the corresponding slot and there is also a second nipple 16, not yet in place, with a second cable 12 attached thereto. In contrast, FIG. 5b shows a subsequent assembly situation, in which both nipples 16 are in place and the steel cable 12 or the cables are guided or laid in the circumferential groove 18 in the opposite sense, lying next to one another in the back disk section.

The invention is not limited by the embodiments described above which are presented as examples only but can be modified in various ways within the scope of protection defined by the appended patent claims.

I claim:

1. A two-wheeled scooter, comprising:

a frame;

a standing board attached to the frame;

two steering tubes mounted on the frame;

a pivotable front wheel fork arranged in a first of the steering tubes so as to be pivotable about a first pivot axis extending through said first steering tube;

a pivotable rear wheel fork arranged in a second of the steering tubes so as to be pivotable about a second pivot axis extending through said second steering tube, the first and second pivot axes being inclined toward one another at an acute angle of at least 5° relative to a vertical axis of the frame;

a handle bar connected to the front wheel fork whereby the front wheel fork can be turned; and means for connecting the rear wheel fork with the front wheel fork so that turning of the front wheel fork turns the rear wheel fork, the connecting means including a first driving disk attached to the front wheel fork, a second driving disk attached to the rear wheel fork, and a flexible transmission element arranged to operatively connect the first driving disk with the second driving disk so that the front wheel fork and the rear wheel fork are turned in opposite directions in equal angular amounts, the frame being configured to have an asymmetrical S-shape from the front steering tube to the rear steering tube.

2. A scooter as defined in claim 1, wherein the forks are mirror-symmetrical.

3. A scooter as defined in claim 1, wherein the acute angles of inclination of the two steering tubes relative to the vertical axis of the frame are of different sizes so that extensions of the pivot axes of the steering tubes intersect at a point above the frame.

4. A scooter as defined in claim 1, and further comprising deflection rollers attached to the frame so as to guide the transmission element.

5. A scooter as defined in claim 1, wherein the standing board has an upwardly curved rear part.

6. A scooter as defined in claim 1, and further comprising a front wheel, a rear wheel, and brake means on at least one of the front wheel and rear wheel.

7. A scooter as defined in claim 1, wherein the transmission element is one of a belt and a cable that is guided via the driving disks.

8. A scooter as defined in claim 7, wherein the transmission element is a steel cable.

9. A scooter as defined in claim 8, wherein the steel cable has two ends, a nipple being fixed at each of the two ends, the driving disks having a circumferential guide groove, at least one of the driving disks having adjacent axial openings with a radial slot open relative to a circumference of the driving disks, the nipples being inserted in the axial openings so that the steel cable executes a partially doubled winding in the circumferential guide groove of the driving disk, so as to permit transmission of a turning angle of turn greater than 90°.

10. A scooter as defined in claim 4, wherein the transmission element has ends formed with cylindrical nipples for attachment to bores in the driving disks.

11. A two-wheeled scooter, comprising:

a frame;

a standing board attached to the frame;

two steering tubes mounted on the frames;

a pivotable front wheel fork arranged in a first of the steering tubes so as to be pivotable about a first pivot axis extending through said first steering tube;

a pivotable rear wheel fork arranged in a second of the steering tubes so as to be pivotable about a second pivot axis extending through said second steering tube, the first and second pivot axes being inclined toward one another at an acute angle of at least 5° relative to a vertical axis of the frame;

a handle bar connected to the front wheel fork whereby the front wheel fork can be turned; and means for connecting the rear wheel fork with the front wheel fork so that turning of the front wheel fork turns the rear wheel fork, the connecting means including a first driving disk attached to the front wheel fork, a second driving disk attached to the rear wheel fork, and a flexible steel cable arranged to operatively connect the first driving disk with the second driving disk so that the front wheel fork and rear wheel fork are turned in opposite directions in equal angular amounts, the steel cable having two ends, a nipple being fixed at each of the two ends, the driving disks having a circumferential guide groove, at least one of the driving disks having adjacent axial openings with a radial slot open relative to a circumference of the driving disks, the nipples being inserted in the axial openings so that the steel cable executes a partially doubled winding in the circumferential guide groove of the driving disk, so as to permit transmission of a turning angle of greater than 90°.

12. A scooter as defined in claim 11, wherein the forks are mirror-symmetrical.

13. A scooter as defined in claim 11, wherein the acute angles of inclination of the two steering tubes relative to the vertical axis of the frame are of different sizes so that extensions of the pivot axes of the steering tubes intersect at a point above the frame.

14. A scooter as defined in claim 11, and further comprising deflection rollers attached to the frame so as to guide the steel cable.

15. A scooter as defined in claim 11, wherein the standing board has an upwardly curved rear part.

16. A scooter as defined as defined in claim 11, and further comprising a front wheel, a rear wheel, and brake means on at least one of the front wheel and the rear wheel.

17. A scooter as defined as defined in claim 11, wherein the frame is configured to have an asymmetrical S-shape front the front steering tube to the rear steering tube.

* * * * *